US012706644B2

(12) United States Patent
Hindy et al.

(10) Patent No.: US 12,706,644 B2
(45) Date of Patent: Aug. 11, 2026

(54) CHANNEL STATE INFORMATION REPORT CONFIGURATION

(71) Applicant: Lenovo (Singapore) Pte. Ltd., New Tech Park (SG)

(72) Inventors: Ahmed Monier Ibrahim Saleh Hindy, Aurora, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 333 days.

(21) Appl. No.: 18/251,068

(22) PCT Filed: Oct. 29, 2021

(86) PCT No.: PCT/IB2021/060048
§ 371 (c)(1),
(2) Date: Apr. 28, 2023

(87) PCT Pub. No.: WO2022/091031
PCT Pub. Date: May 5, 2022

(65) Prior Publication Data

US 2024/0333353 A1 Oct. 3, 2024

Related U.S. Application Data

(60) Provisional application No. 63/108,251, filed on Oct. 30, 2020.

(51) Int. Cl.
*H04W 24/10* (2009.01)
*H04B 7/06* (2006.01)

(52) U.S. Cl.
CPC ......... *H04B 7/0626* (2013.01); *H04B 7/0632* (2013.01); *H04B 7/0639* (2013.01)

(58) Field of Classification Search
CPC ... H04L 5/0048; H04L 5/0057; H04L 5/0007; H04L 5/0044; H04L 5/0053;
(Continued)

(56) References Cited

U.S. PATENT DOCUMENTS

2013/0003788 A1 1/2013 Marinier et al.
2013/0196699 A1 8/2013 Davydov et al.
(Continued)

FOREIGN PATENT DOCUMENTS

EP 2587876 B1 4/2017
EP 3541111 A1 * 9/2019 ............ H04W 72/54
(Continued)

OTHER PUBLICATIONS

PCT/IB2021/060048, “Notification of Transmittal of the International Search Report and the Written Opinion of the International Searching Authority, or the Declaration”, International Searching Authority, Feb. 22, 2022, pp. 1-15.
(Continued)

*Primary Examiner* — Quan M Hua
(74) *Attorney, Agent, or Firm* — Kunzler Needham & Hilton; Bruce R. Needham

(57) ABSTRACT

Apparatuses, methods, and systems are disclosed for channel state information (“CSI”) report configuration. One method includes receiving a CSI reporting setting. The CSI reporting setting includes a CSI reference signal (“RS”) resource setting, and the CSI reporting setting includes an indication of CSI feedback reporting for multiple transmission points. The method includes identifying transmission hypotheses based on the CSI reporting setting. The hypotheses include a combination of single-point transmission from a transmission and reception point (“TRP”), or multi-point joint transmission from two TRPs. The method includes receiving a CSI RS resource based on the CSI RS
(Continued)

resource setting. The method includes generating a set of a CSI report based on the CSI reporting setting. The CSI report includes two parts. The method includes feeding back the set of the CSI report.

20 Claims, 11 Drawing Sheets

(58) Field of Classification Search
CPC ... H04L 5/0058; H04L 5/0062; H04L 5/0094; H04L 5/0023; H04L 5/005; H04L 5/001; H04L 5/0082; H04L 5/0091; H04L 5/1469; H04W 24/10; H04W 72/23; H04W 24/08; H04W 72/542; H04W 76/27; H04W 8/24; H04W 80/02; H04B 7/0695; H04B 7/0456; H04B 7/0626; H04B 7/0639; H04B 7/088; H04B 7/0452; H04B 7/06; H04B 7/0632
See application file for complete search history.

(56) References Cited

U.S. PATENT DOCUMENTS

| | | | | |
|---|---|---|---|---|
| 2013/0208604 | A1 | 8/2013 | Lee et al. | |
| 2013/0279455 | A1 | 10/2013 | Park et al. | |
| 2015/0139016 | A1 | 5/2015 | Ma et al. | |
| 2018/0175993 | A1 | 6/2018 | Onggosanusi et al. | |
| 2019/0059013 | A1* | 2/2019 | Rahman | H04L 1/00 |
| 2019/0245165 | A1* | 8/2019 | Ijuin | H01M 50/121 |
| 2022/0094399 | A1 | 3/2022 | Gao et al. | |
| 2023/0120578 | A1* | 4/2023 | Khoshnevisan | H04L 1/0027 370/329 |
| 2023/0155654 | A1 | 5/2023 | Matsumura et al. | |
| 2023/0328569 | A1* | 10/2023 | Khoshnevisan | H04B 7/0639 370/252 |
| 2023/0370918 | A1 | 11/2023 | Maleki et al. | |
| 2023/0379031 | A1 | 11/2023 | Sun et al. | |
| 2023/0412226 | A1 | 12/2023 | Hindy et al. | |
| 2024/0250727 | A1 | 7/2024 | Muruganathan et al. | |
| 2024/0413954 | A1 | 12/2024 | Hindy et al. | |

FOREIGN PATENT DOCUMENTS

| | | | | |
|---|---|---|---|---|
| WO | WO-2013025558 | A1 * | 2/2013 | H04W 72/541 |
| WO | WO-2020092468 | A1 * | 5/2020 | H04B 7/0632 |

OTHER PUBLICATIONS

Samsung et al., "WF on Type I and II CSI codebooks", 3GPP TSG-RAN WG1 #89 R1-1709232, May 15-19, 2017, pp. 1-24.
Huawei et al., "CSI measurement enhancement for multi-TRP/panel transmission", 3GPP TSG RAN WG1 Meeting #97 R1-1906038, May 13-17, 2019, pp. 1-4.
LG Electronics, "Discussion on CSI enhancement for NCJT", 3GPP TSG RAN WG1 #97 R1-1906736, May 13-17, 2019, pp. 1-3.
Ericsson, "Views on CSI framework for multi-TRP", 3GPP TSG RAN WG1 Meeting #97 R1-1907424, May 13-17, 2019, pp. 1-2.
Spreadtrum Communications, "Discussion on CSI enhancement for multiple TRP/Panel transmission", 3GPP TSG RAN WG1 #98 R1-1908961, Aug. 26-30, 2019, pp. 1-4.
3GPP, "3rd Generation Partnership Project; Technical Specification Group Radio Access Network; NR; Multiplexing and channel coding (Release 16)", 3GPP TS 38.212 V16.3.0, Sep. 2020, pp. 1-152.
3GPP, "3rd Generation Partnership Project; Technical Specification Group Radio Access Network; NR; Physical layer procedures for data (Release 16)", 3GPP TS 38.214 V16.3.0, Sep. 2020, pp. 1-166.
3GPP, "3rd Generation Partnership Project; Technical Specification Group Radio Access Network; NR; Radio Resource Control (RRC) protocol specification (Release 16)", 3GPP TS 38.331 V16.2.0, Sep. 2020, pp. 1-921.
PCT/IB2021/060051, "Notification of Transmittal of the International Search Report and the Written Opinion of the International Searching Authority, or the Declaration", International Searching Authority, Feb. 23, 2022, pp. 1-17.
U.S. Appl. No. 18/251,087, "Office Action Summary", United States Patent and Trademark Office, Oct. 17, 2025, pp. 1-56.
U.S. Appl. No. 18/251,087, Final Office Action, United States Patent and Trademark Office, Feb. 9, 2026, pp. 1-43.

* cited by examiner

400

```
-- ASN1START
-- TAG-CSI-REPORTCONFIG-START

CSI-ReportConfig ::=                SEQUENCE {
    reportConfigId                          CSI-ReportConfigId,
    carrier                                 ServCellIndex              OPTIONAL,   -- Need S
    resourcesForChannelMeasurement          CSI-ResourceConfigId,
    csi-IM-ResourcesForInterference         CSI-ResourceConfigId       OPTIONAL,   -- Need R
    nzp-CSI-RS-ResourcesForInterference     CSI-ResourceConfigId       OPTIONAL,   -- Need R

    reportConfigType                        CHOICE {
        periodic                              SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-Resource
        },
        semiPersistentOnPUCCH                 SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-Resource
        },
        semiPersistentOnPUSCH                SEQUENCE {
            reportSlotConfig                 ENUMERATED {sl5, sl10, sl20, sl40, sl80, sl160, sl320},
            reportSlotOffsetList             SEQUENCE (SIZE (1.. maxNrofUL-Allocations)) OF
INTEGER(0..32),
            p0alpha                                 P0-PUSCH-AlphaSetId
        },
        aperiodic                            SEQUENCE {
            reportSlotOffsetList             SEQUENCE (SIZE (1..maxNrofUL-Allocations)) OF
INTEGER(0..32)
        }
    },
    mTRPCSIEnabled                           ENUMERATED {TRUE}        OPTIONAL,  -- Need R

                                           [.....................]

-- TAG-CSI-REPORTCONFIG-STOP
-- ASN1STOP
```

```
-- ASN1START
-- TAG-CSI-REPORTCONFIG-START

CSI-ReportConfig ::=                SEQUENCE {
    reportConfigId                          CSI-ReportConfigId,
    carrier                                 ServCellIndex           OPTIONAL,    -- Need S
    resourcesForChannelMeasurement          CSI-ResourceConfigId,
    csi-IM-ResourcesForInterference         CSI-ResourceConfigId    OPTIONAL,    -- Need R
    nzp-CSI-RS-ResourcesForInterference     CSI-ResourceConfigId    OPTIONAL,    -- Need R
    resourcesForChannel1Measurement         CSI-ResourceConfigId    OPTIONAL     -- Need R


    reportConfigType                        CHOICE {
        periodic                              SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-Resource
        },
        semiPersistentOnPUCCH                 SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-Resource
        },
        semiPersistentOnPUSCH                SEQUENCE {
            reportSlotConfig                 ENUMERATED {sl5, sl10, sl20, sl40, sl80, sl160, sl320},
            reportSlotOffsetList             SEQUENCE (SIZE (1.. maxNrofUL-Allocations)) OF INTEGER(0..32),
            p0alpha                                 P0-PUSCH-AlphaSetId
        },
        aperiodic                            SEQUENCE {
            reportSlotOffsetList             SEQUENCE (SIZE (1..maxNrofUL-Allocations)) OF INTEGER(0..32)
        }
    },

                                        [.....................]

-- TAG-CSI-REPORTCONFIG-STOP
-- ASN1STOP
```

```
-- ASN1START
-- TAG-CSI-REPORTCONFIG-START

CSI-ReportConfig ::=                 SEQUENCE {
    reportConfigId                          CSI-ReportConfigId,
    carrier                                 ServCellIndex           OPTIONAL,   -- Need S
    resourcesForChannelMeasurement          CSI-ResourceConfigId,
    csi-IM-ResourcesForInterference         CSI-ResourceConfigId    OPTIONAL,   -- Need R
    nzp-CSI-RS-ResourcesForInterference     CSI-ResourceConfigId    OPTIONAL,   -- Need R

    secondary-reportConfigId                CSI-ReportConfigId      OPTIONAL,    -- Need R


    reportConfigType                        CHOICE {
        periodic                              SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-Resource
        },
        semiPersistentOnPUCCH                 SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-Resource
        },
        semiPersistentOnPUSCH                SEQUENCE {
            reportSlotConfig                 ENUMERATED {sl5, sl10, sl20, sl40, sl80, sl160, sl320},
            reportSlotOffsetList             SEQUENCE (SIZE (1.. maxNrofUL-Allocations)) OF INTEGER(0..32),
            p0alpha                                 P0-PUSCH-AlphaSetId
        },
        aperiodic                            SEQUENCE {
            reportSlotOffsetList             SEQUENCE (SIZE (1..maxNrofUL-Allocations)) OF INTEGER(0..32)
        }
    },

                                         [...........]

-- TAG-CSI-REPORTCONFIG-STOP
-- ASN1STOP
```

```
-- ASN1START
-- TAG-CSI-REPORTCONFIG-START

CSI-ReportConfig ::=                SEQUENCE {
    reportConfigId                          CSI-ReportConfigId,
    carrier                                 ServCellIndex           OPTIONAL,   -- Need S
    resourcesForChannelMeasurement          CSI-ResourceConfigId,
    csi-IM-ResourcesForInterference         CSI-ResourceConfigId    OPTIONAL,   -- Need R
    nzp-CSI-RS-ResourcesForInterference     CSI-ResourceConfigId    OPTIONAL,   -- Need R

                                        [.....................]


    timeRestrictionForChannelMeasurements       ENUMERATED {configured, notConfigured},
    timeRestrictionForInterferenceMeasurements  ENUMERATED {configured, notConfigured},
    codebookConfig                              CodebookConfig              OPTIONAL,   -- Need R
    codebookConfig2                             CodebookConfig              OPTIONAL,   -- Need R
    dummy                                       ENUMERATED {n1, n2}         OPTIONAL,   -- Need R

                                        [.....................]

    reportQuantity-r16                          CHOICE {
       cri-SINR-r16                                 NULL,
       ssb-Index-SINR-r16                           NULL
    }                                                                       OPTIONAL,   -- Need R
    codebookConfig-r16                          CodebookConfig-r16          OPTIONAL    -- Need R
    codebookConfig2-r17                         CodebookConfig-r17          OPTIONAL    -- Need R
    ]]
}

                                        [.....................]

-- TAG-CSI-REPORTCONFIG-STOP
-- ASN1STOP
```

FIG. 7

```
-- ASN1START
-- TAG-CSI-REPORTCONFIG-START

CSI-ReportConfig ::=                SEQUENCE {
    reportConfigId                          CSI-ReportConfigId,
    carrier                                 ServCellIndex              OPTIONAL,    -- Need S
    resourcesForChannelMeasurement          CSI-ResourceConfigId,
    csi-IM-ResourcesForInterference         CSI-ResourceConfigId       OPTIONAL,    -- Need R
    nzp-CSI-RS-ResourcesForInterference     CSI-ResourceConfigId       OPTIONAL,    -- Need R


    reportConfigType                        CHOICE {
        periodic                              SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-Resource
        },
        semiPersistentOnPUCCH                 SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-Resource
        },
        semiPersistentOnPUSCH                SEQUENCE {
            reportSlotConfig                 ENUMERATED {sl5, sl10, sl20, sl40, sl80, sl160, sl320},
            reportSlotOffsetList             SEQUENCE (SIZE (1.. maxNrofUL-Allocations)) OF INTEGER(0..32),
            p0alpha                                 P0-PUSCH-AlphaSetId
        },
        aperiodic                            SEQUENCE {
            reportSlotOffsetList             SEQUENCE (SIZE (1..maxNrofUL-Allocations)) OF INTEGER(0..32)
        }
    },
    numCSIreports                                   ENUMERATED {1,2,3,4}      OPTIONAL,  -- Need R

                                          [......................]

-- TAG-CSI-REPORTCONFIG-STOP
-- ASN1STOP
```

```
-- ASN1START
-- TAG-CODEBOOKCONFIG-START

CodebookConfig ::=                              SEQUENCE {
    codebookType                                    CHOICE {

                                 {.....................}
    }
    numReports                   ENUMERATED {1,2}             OPTIONAL,       -- Need R
}

CodebookConfig-r16  ::=          SEQUENCE  {
    codebookType                                    CHOICE {

                                 {.....................}
    }
    numReports                   ENUMERATED {1,2}             OPTIONAL,       -- Need R
}

-- TAG-CODEBOOKCONFIG-STOP
-- ASN1STOP
```

FIG. 9

CHANNEL STATE INFORMATION REPORT CONFIGURATION

CROSS-REFERENCE TO RELATED APPLICATIONS

This application claims priority to U.S. Patent Application Ser. No. 63/108,251 entitled "APPARATUSES, METHODS, AND SYSTEMS FOR CSI ENHANCEMENTS FOR MULTI-TRP WITH CONFINED CONFIGURATION AND REPORTING" and filed on Oct. 30, 2020 for Ahmed Monier Ibrahim Saleh Hindy, which is incorporated herein by reference in its entirety.

FIELD

The subject matter disclosed herein relates generally to wireless communications and more particularly relates to channel state information report configuration.

BACKGROUND

In certain wireless communications networks, there may be multiple TRPs. In such networks, there may be inefficient and/or excessive communications.

BRIEF SUMMARY

Methods for channel state information report configuration are disclosed. Apparatuses and systems also perform the functions of the methods. One embodiment of a method includes receiving, at a user equipment, at least one channel state information reporting setting. The at least one channel state information reporting setting includes at least one channel state information reference signal resource setting, and the channel state information reporting setting includes an indication of channel state information feedback reporting for multiple transmission points in a mobile communication network. In some embodiments, the method includes identifying a set of transmission hypotheses based on the channel state information reporting setting. The hypotheses include a combination of single-point transmission from at least one transmission and reception point, or multi-point joint transmission from two transmission and reception points. In certain embodiments, the method includes receiving at least one channel state information reference signal resource transmitted from the mobile communication network based on the channel state information reference signal resource setting. In various embodiments, the method includes generating a set of at least one channel state information report based on the channel state information reporting setting. The at least one channel state information report includes a value of a precoder matrix indicator, a rank indicator, a channel state information reference signal resource indicator, a layer indicator, a channel quality indicator, a synchronization signal block resource indicator, or a combination thereof, and the at least one channel state information report includes two parts. In some embodiments, the method includes feeding back the set of the at least one channel state information report to the mobile communication network.

One apparatus for channel state information report configuration includes a user equipment. In some embodiments, the apparatus includes a receiver that receives at least one channel state information reporting setting. The at least one channel state information reporting setting includes at least one channel state information reference signal resource setting, and the channel state information reporting setting includes an indication of channel state information feedback reporting for multiple transmission points in a mobile communication network. In various embodiments, the apparatus includes a processor that identifies a set of transmission hypotheses based on the channel state information reporting setting. The hypotheses include a combination of single-point transmission from at least one transmission and reception point, or multi-point joint transmission from two transmission and reception points. In certain embodiments, the apparatus includes a transmitter. The receiver receives at least one channel state information reference signal resource transmitted from the mobile communication network based on the channel state information reference signal resource setting: the processor generates a set of at least one channel state information report based on the channel state information reporting setting, wherein the at least one channel state information report includes a value of a precoder matrix indicator, a rank indicator, a channel state information reference signal resource indicator, a layer indicator, a channel quality indicator, a synchronization signal block resource indicator, or a combination thereof, and the at least one channel state information report includes two parts; and the transmitter feeds back the set of the at least one channel state information report to the mobile communication network.

Another embodiment of a method for channel state information report configuration includes transmitting, from a network device, at least one channel state information reporting setting. The at least one channel state information reporting setting includes at least one channel state information reference signal resource setting, the channel state information reporting setting includes an indication of channel state information feedback reporting for multiple transmission points in a mobile communication network, a set of transmission hypotheses is identified based on the channel state information reporting setting, and the hypotheses include a combination of single-point transmission from at least one transmission and reception point, or multi-point joint transmission from two transmission and reception points. In some embodiments, the method includes transmitting at least one channel state information reference signal resource transmitted based on the channel state information reference signal resource setting. A set of at least one channel state information report is generated based on the channel state information reporting setting, the at least one channel state information report includes a value of a precoder matrix indicator, a rank indicator, a channel state information reference signal resource indicator, a layer indicator, a channel quality indicator, a synchronization signal block resource indicator, or a combination thereof, and the at least one channel state information report includes two parts. In certain embodiments, the method includes receiving feedback comprising the set of the at least one channel state information report.

Another apparatus for channel state information report configuration includes a network device. In some embodiments, the apparatus includes a transmitter that: transmits at least one channel state information reporting setting, wherein the at least one channel state information reporting setting includes at least one channel state information reference signal resource setting, the channel state information reporting setting includes an indication of channel state information feedback reporting for multiple transmission points in a mobile communication network, a set of transmission hypotheses is identified based on the channel state information reporting setting, and the hypotheses include a combination of single-point transmission from at least one transmission and reception point, or multi-point joint transmission from two transmission and reception points; and transmits at least one channel state information reference signal resource transmitted based on the channel state information reference signal resource setting. A set of at least one channel state information report is generated based on the channel state information reporting setting, the at least one channel state information report includes a value of a precoder matrix indicator, a rank indicator, a channel state information reference signal resource indicator, a layer indicator, a channel quality indicator, a synchronization signal block resource indicator, or a combination thereof, and the at least one channel state information report includes two parts. In various embodiments, the apparatus includes a receiver that receives feedback comprising the set of the at least one channel state information report.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a schematic block diagram illustrating a first embodiment of ASN.1 code for CSI-ReportConfig reporting setting IE:

FIG. 5 is a schematic block diagram illustrating a third embodiment of ASN.1 code for CSI-ReportConfig reporting setting IE:

FIG. 6 is a schematic block diagram illustrating a fifth embodiment of ASN.1 code for CSI-ReportConfig reporting setting IE:

FIG. 7 is a schematic block diagram illustrating a first embodiment of ASN.1 code for triggering two CSI reports within CSI-ReportConfig reporting setting IE:

FIG. 8 is a schematic block diagram illustrating a third embodiment of ASN.1 code for triggering two CSI reports within CSI-ReportConfig reporting setting IE:

FIG. 9 is a schematic block diagram illustrating a fourth embodiment of ASN.1 code for triggering two CSI reports within a CodebookConfig codebook configuration IE:

DETAILED DESCRIPTION

Figure 1:
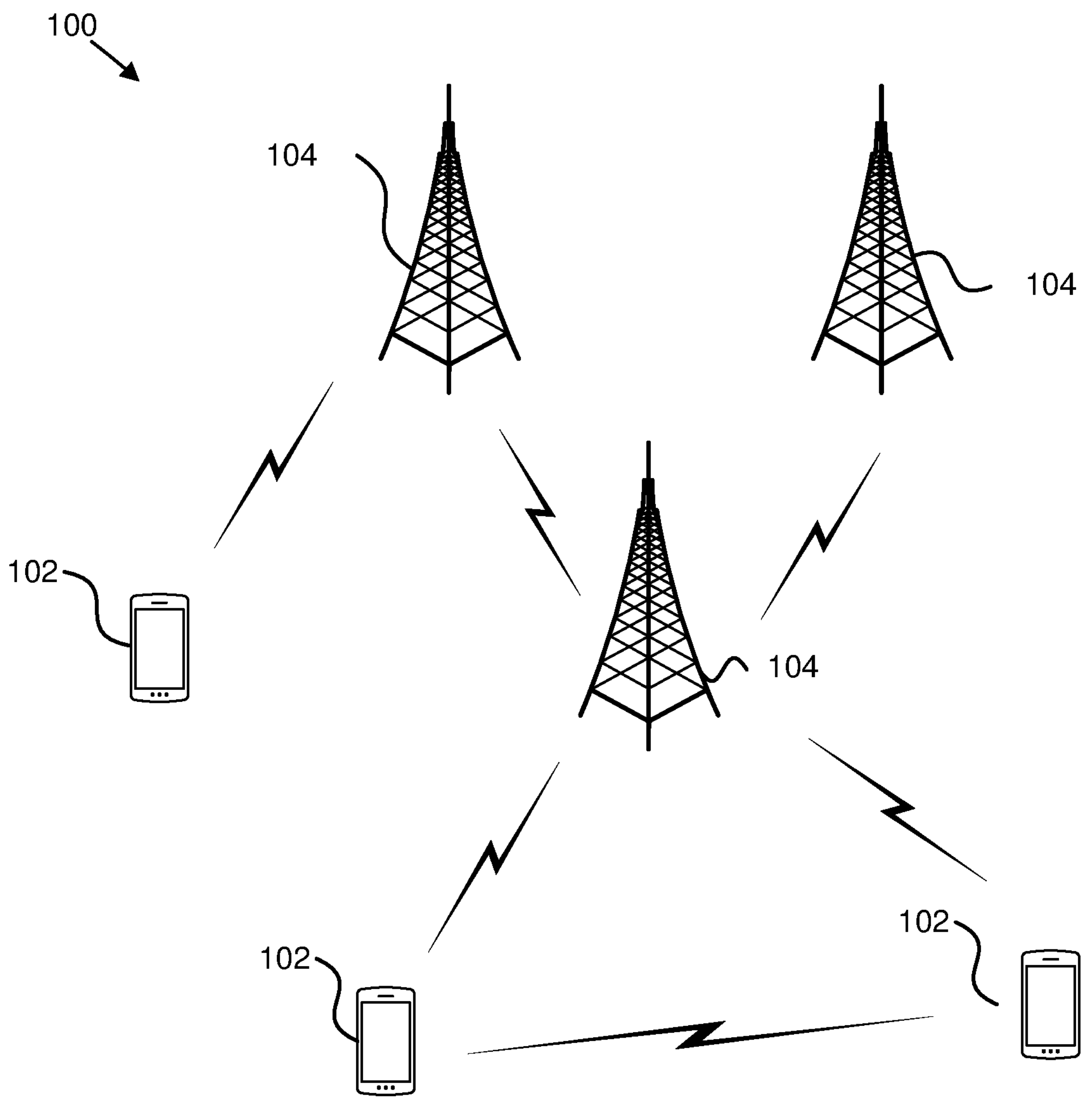
FIG. 1 is a schematic block diagram illustrating one embodiment of a wireless communication system for channel state information report configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including." "comprising." "having." and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for channel state information report configuration. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth R, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive at least one channel state information reporting setting. The at least one channel state information reporting setting includes at least one channel state information reference signal resource setting, and the channel state information reporting setting includes an indication of channel state information feedback reporting for multiple transmission points in a mobile communication network. In some embodiments, the remote unit 102 may identify a set of transmission hypotheses based on the channel state information reporting setting. The hypotheses include a combination of single-point transmission from at least one transmission and reception point, or multi-point joint transmission from two transmission and reception points. In certain embodiments, the remote unit 102 may receive at least one channel state information reference signal resource transmitted from the mobile communication network based on the channel state information reference signal resource setting. In various embodiments, the remote unit 102 may generate a set of at least one channel state information report based on the channel state information reporting setting. The at least one channel state information report includes a value of a precoder matrix indicator, a rank indicator, a channel state information reference signal resource indicator, a layer indicator, a channel quality indicator, a synchronization signal block resource indicator, or a combination thereof, and the at least one channel state information report includes two parts. In some embodiments, the remote unit 102 may feed back the set of the at least one channel state information report to the mobile communication network. Accordingly, the remote unit 102 may be used for channel state information report configuration.

In certain embodiments, a network unit 104 may transmit at least one channel state information reporting setting. The at least one channel state information reporting setting includes at least one channel state information reference signal resource setting, the channel state information reporting setting includes an indication of channel state information feedback reporting for multiple transmission points in a mobile communication network, a set of transmission hypotheses is identified based on the channel state information reporting setting, and the hypotheses include a combination of single-point transmission from at least one transmission and reception point, or multi-point joint transmission from two transmission and reception points. In some embodiments, the network unit 104 may transmit at least one channel state information reference signal resource transmitted based on the channel state information reference signal resource setting. A set of at least one channel state information report is generated based on the channel state information reporting setting, the at least one channel state information report includes a value of a precoder matrix indicator, a rank indicator, a channel state information reference signal resource indicator, a layer indicator, a channel quality indicator, a synchronization signal block resource indicator, or a combination thereof, and the at least one channel state information report includes two parts. In certain embodiments, the network unit 104 may receive feedback comprising the set of the at least one channel state information report. Accordingly, the network unit 104 may be used for channel state information report configuration.

Figure 2:
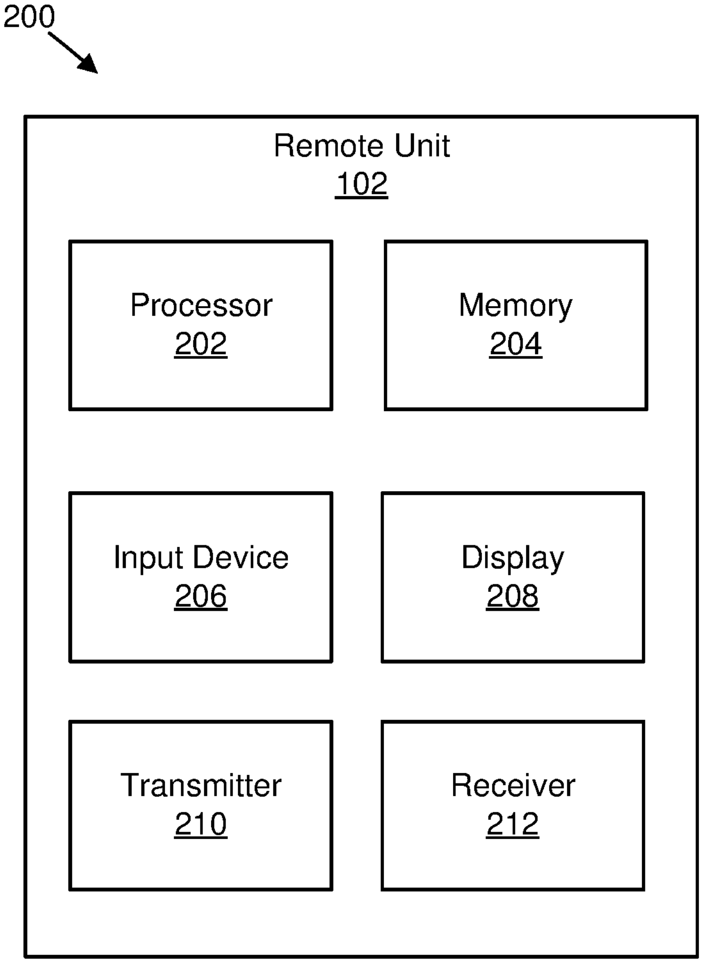
FIG. 2 is a schematic block diagram illustrating one embodiment of an apparatus that may be used for channel state information report configuration.

FIG. 2 depicts one embodiment of an apparatus 200 that may be used for channel state information report configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 receives at least one channel state information reporting setting. The at least one channel state information reporting setting includes at least one channel state information reference signal resource setting, and the channel state information reporting setting includes an indication of channel state information feedback reporting for multiple transmission points in a mobile communication network. In various embodiments, the processor 202 identifies a set of transmission hypotheses based on the channel state information reporting setting. The hypotheses include a combination of single-point transmission from at least one transmission and reception point, or multi-point joint transmission from two transmission and reception points. In certain embodiments, the receiver 212 receives at least one channel state information reference signal resource transmitted from the mobile communication network based on the channel state information reference signal resource setting; the processor 202 generates a set of at least one channel state information report based on the channel state information reporting setting, wherein the at least one channel state information report includes a value of a precoder matrix indicator, a rank indicator, a channel state information reference signal resource indicator, a layer indicator, a channel quality indicator, a synchronization signal block resource indicator, or a combination thereof, and the at least one channel state information report includes two parts; and the transmitter 210 feeds back the set of the at least one channel state information report to the mobile communication network.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
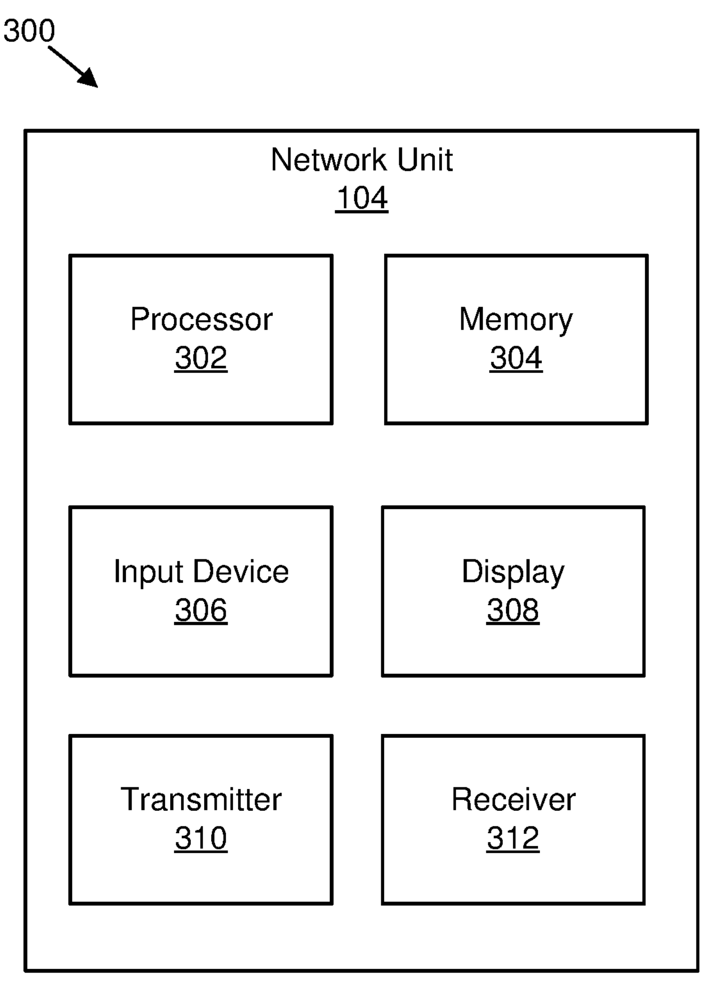
FIG. 3 is a schematic block diagram illustrating one embodiment of an apparatus that may be used for channel state information report configuration.

FIG. 3 depicts one embodiment of an apparatus 300 that may be used for channel state information report configuration. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits at least one channel state information reporting setting, wherein the at least one channel state information reporting setting includes at least one channel state information reference signal resource setting, the channel state information reporting setting includes an indication of channel state information feedback reporting for multiple transmission points in a mobile communication network, a set of transmission hypotheses is identified based on the channel state information reporting setting, and the hypotheses include a combination of single-point transmission from at least one transmission and reception point, or multi-point joint transmission from two transmission and reception points; and transmits at least one channel state information reference signal resource transmitted based on the channel state information reference signal resource setting. A set of at least one channel state information report is generated based on the channel state information reporting setting, the at least one channel state information report includes a value of a precoder matrix indicator, a rank indicator, a channel state information reference signal resource indicator, a layer indicator, a channel quality indicator, a synchronization signal block resource indicator, or a combination thereof, and the at least one channel state information report includes two parts. In various embodiments, the receiver 312 receives feedback comprising the set of the at least one channel state information report.

In certain embodiments, such as for 3GPP new radio ("NR"), multiple transmission and reception points ("TRPs") or multi-antenna panels within a TRP may communicate simultaneously with one user equipment ("UE") to enhance coverage, throughput, and/or reliability. These enhancements may come at the expense of excessive control signaling between the network side and the UE side so as to communicate the best transmission configuration (e.g., whether to support multi-point transmission), and, if so, which TRPs would operate simultaneously, in addition to a possibly super-linear increase in the amount of channel state information ("CSI") feedback reported from the UE to the network, since a distinct report may be needed for each transmission configuration. In some embodiments, such as for a Type-II codebook with high resolution, a number of precoder matrix indicator ("PMI") bits fed back from the UE in a gNB via uplink control information ("UCI") may be very large (e.g., >1000 bits at a large bandwidth) even for a single-point transmission. In such embodiments, reducing the number of PMI feedback bits per report may be crucial to improve efficiency. In various embodiments, multiple input multiple output ("MIMO") enhancements may include multi TRP ("mTRP") and multi-panel transmissions. The purpose of mTRP transmission may be to improve a spectral efficiency as well as a reliability and robustness of a connection, and it may cover both ideal and nonideal backhaul. In certain embodiments, for increasing a reliability using mTRP, ultra-reliable low-latency communication ("URLLC") under mTRP transmission may be used, where the UE may be served by multiple TRPs forming a coordination cluster, possibly connected to a central processing unit.

In some embodiments, a UE may be dynamically scheduled to be served by one of multiple TRPs in a cluster. In such embodiments, the network may pick two TRPs to perform joint transmission. Moreover, in such embodiments, the UE may need to report needed CSI information for the network for it to decide an mTRP downlink transmission scheme.

In various embodiments, a number of transmission hypotheses increases exponentially with a number of TRPs in the coordination cluster. For example, for 4 TRPs, there are 10 transmission hypotheses: (TRP 1), (TRP 2), (TRP 3), (TRP 4), (TRP 1, TRP 2), (TRP 1, TRP 3), (TRP 1, TRP 4), (TRP 2, TRP 3), (TRP 2, TRP 4), and (TRP 3, TRP 4). The overhead from reporting dramatically increases with the size of the coordination cluster. In general, the presence of K TRPs may trigger up to $$K + \binom{K}{n},$$

where $$\binom{K}{n}$$

represents a binomial coefficient representing a number of possible unordered n-tuples selected from a set of K elements, where $n \leq K$.

In certain embodiments, UL transmission resources on which CSI reports are transmitted might not be enough, and partial CSI omission may be necessary. In some embodiments, CSI reports may be prioritized according to: 1) time-domain behavior and physical channel, where more dynamic reports are given precedence over less dynamic reports and a physical uplink shared channel ("PUSCH") has precedence over a physical uplink control channel ("PUCCH"): 2) CSI content, where beam reports (e.g., layer 1 ("L1") reference signal received power ("RSRP") ("L1-RSRP") reporting) have priority over regular CSI reports: 3) a serving cell to which the CSI corresponds (e.g., for carrier aggregation ("CA") operation—CSI corresponding to a primary cell ("PCell") has priority over CSI corresponding to secondary cells ("SCells")); and/or 4) a CSI report setting identifier ("ID") (e.g., reportConfigID).

In various embodiments, for the purpose of mTRP URLLC physical downlink shared channel ("PDSCH") transmission, a UE may be enabled to: 1) reduce CSI reporting overhead without degrading performance; and/or 2) limit CSI triggering and reporting overhead and complexity for mTRP transmission to levels that are close to that of CSI triggering and reporting for single-TRP transmission.

In certain embodiments, one or more elements or features from one or more of the described embodiments herein may be combined (e.g., for CSI measurement, feedback generation and/or reporting) which may reduce overall CSI feedback overhead.

In some embodiments, one or more of the following assumptions may be made: 1) the "TRP" notion may include at least one of TRPs, nodes, panels, communication means (e.g., signals and/or channels) associated with a control resource set ("CORESET") pool, communication associated with a transmission configuration indicator ("TCI") state from a transmission configuration comprising at least two TCI states: 2) a codebook type used is arbitrary (e.g., flexibility to use different codebook types (e.g., Type-I and Type-II codebooks) unless otherwise stated); and/or 3) either a single downlink control information ("DCI") or multiple DCI that trigger a UE, where an mTRP scheme is based on spatial division multiplexing ("SDM") (e.g., scheme 1a), frequency division multiplexing ("FDM") (e.g., schemes 2a and/or 2b), and time division multiplexing ("TDM") (e.g., schemes 3 and/or 4). Other transmission schemes may aslo be used.

In various embodiments, a UE is configured by higher layers with one or more CSI-ReportConfig reporting settings for CSI reporting, one or more CSI-ResourceConfig resource settings for CSI measurement, and one or two lists of trigger states (e.g., given by higher layer parameters CSI-AperiodicTriggerStateList and CSI-SemiPersistentOnPUSCH-TriggerStateList). Each trigger state in a CSI-AperiodicTriggerStateList may contain a list of a subset of associated CSI-ReportConfigs indicating resource set IDs for a channel and/or for interference. Each trigger state in CSI-SemiPersistentOnPUSCH-TriggerStateList may contain one or more associated CSI-ReportConfig.

In certain embodiments, a UE is configured with one or more CSI-ReportConfig reporting settings. Different embodiments of CSI reporting settings may be in different embodiments described herein. Moreover, a setup with a combination of one or more embodiments herein may be used.

In some embodiments, a UE is configured with one CSI-ReportConfig reporting setting, where one resourcesForChannelMeasurement non-zero power ("NZP") CSI reference signal ("RS") ("CSI-RS"), and one nzp-CSI-RS-ResourcesForInterference NZP CSI-RS are triggered, and each corresponds to a different NZP CSI-RS resource. Triggering additional CSI-RSs may also be done. In such embodiments, the UE may feed back one or more CSI reports or computed CSIs based on joint transmission which is based on the two aforementioned CSI-RS resources. In addition, the UE may feed back one or more CSI reports or computed CSIs corresponding to single TRP transmission from one TRP, using either the resourcesForChannelMeasurement NZP CSI-RS or nzp-CSI-RS-ResourcesForInterference NZP CSI-RS for generating each CSI report or CSI. The one or more computed CSIs may be reported in a single CSI report (e.g., using joint encoding or separate encoding and/or bit-fields for at least a portion of the one or more computed CSI) by the UE. Joint TRP transmission may be indicated from a TCI value (e.g., two TCI values or a TCI tuple) in triggering DCI. In various embodiments, a higher-layer parameter (e.g., mTRP-CSI-Enabled) may be included in a Report Setting that indicates that the CSI report configuration includes joint TRP transmission hypothesis. An example of abstract syntax notation ("ASN") ("ASN.1") code the corresponds to a CSI-ReportConfig reporting setting information element ("IE") is provided in FIG. 4. Specifically, FIG. 4 is a schematic block diagram illustrating a first embodiment of ASN. 1 code 400 for CSI-ReportConfig reporting setting IE.

In a second embodiment, a UE is configured with one CSI-ReportConfig reporting setting, wherein one resourcesForChannelMeasurement NZP CSI-RS is triggered. Triggering additional CSI-RSs is not precluded. The UE may feed back one or more CSI reports or computed CSIs based on joint transmission, wherein two disjoint sets of CSI-RS ports are indicated to the UE. Moreover, the UE may feed back one or more CSI reports or computed CSIs, wherein one or more of a CSI report, a PMI, a rank indicator ("RI"), CSI corresponding to a subset of the layers fed back in a PMI including one or more layers, correspond to or are based on one CSI-RS port group. A higher-layer parameter may be included in the report setting that indicates the CSI report configuration includes joint TRP transmission hypothesis. Om certain embodiments, joint TRP transmission may be indicated from a TCI value in triggering DCI.

In a third embodiment, a UE is configured with one CSI-ReportConfig reporting setting, wherein one resourcesForChannelMeasurement NZP CSI-RS, and one resourcesForChannel1Measurement are defined, where each corresponds to a different NZP CSI-RS resource. Triggering additional CSI-RSs is not precluded. The UE may feed back one or more CSI reports based on joint transmission based on the two aforementioned CSI-RS resources. In addition, the UE may feed back one or more CSI reports or computed CSIs corresponding to single TRP transmission from one TRP, using either the resourcesForChannelMeasurement NZP CSI-RS or the resourcesForChannel1Measurement NZP CSI-RS, for generating each CSI Report. An example of the ASN.1 code that corresponds to the CSI-ReportConfig reporting setting IE is provided in FIG. 5 Specifically. Specifically, FIG. 5 is a schematic block diagram illustrating a third embodiment of ASN.1 code 500 for CSI-ReportConfig reporting setting IE.

In a fourth embodiment, a UE is configured with two CSI-ReportConfig reporting settings, wherein each reporting setting triggers one resourcesForChannelMeasurement NZP CSI-RS, and one nzp-CSI-RS-ResourcesForInterference NZP CSI-RS. The NZP CSI-RS resources used for channel measurement and interference in one report setting may be the same as the NZP CSI-RS resources for interference and channel measurement. Triggering additional CSI-RSs in each reporting setting is not precluded. The UE may feed back one or more CSI reports corresponding to each reporting setting.

In a fifth embodiment, a UE is configured with two CSI-ReportConfig reporting settings, wherein each reporting setting triggers one resourcesForChannelMeasurement NZP CSI-RS. The NZP CSI-RS resources used for channel measurement in the two reporting settings may be the same. Triggering additional CSI-RSs in each reporting setting is not precluded. The UE may feed back one or more CSI Reports or computed CSIs, wherein one or more of a CSI report, a PMI, an RI, CSI corresponding to a subset of the layers fed back in a PMI including one or more layers, correspond to or are based on one CSI-RS port group. It should be noted that an indicator of an ID of one reporting setting may be included in the other reporting setting (e.g., an optional higher-layer parameter secondary-reportConfigId is introduced in the CSI-ReportConfig reporting setting). An example of the ASN. 1 code the corresponds to the CSI-ReportConfig reporting setting IE is provided in FIG. 6 Specifically. Specifically, FIG. 6 is a schematic block diagram illustrating a fifth embodiment of ASN. 1 code 600 for CSI-ReportConfig reporting setting IE.

In certain embodiments, CSI feedback may be reported over either PUSCH, PUCCH, or both. CSI feedback time-domain behavior may be either periodic, semi-persistent, or aperiodic. One or more CSI reports corresponding to one or more TRPs, one or more channel hypotheses, or both, may be transmitted. CSI feedback may be reported jointly (e.g., one CSI report corresponds to one or more TRPs, one or more channel hypotheses, or both). In some embodiments, CSI feedback may be reported separately (e.g., one CSI report corresponds to one TRP, one channel hypothesis, or both). One CSI-ReportConfig reporting setting may configure one or more CSI reports. Different embodiments of CSI reporting formats under a given reporting setting are provided herein. Moreover, a setup with a combination of one or more embodiments is not precluded.

In a first embodiment for triggering two or more CSI reports, a UE may be triggered to feed back two or more CSI reports within one reporting setting whenever a reporting setting include two CodebookConfig codebook configurations, each corresponding to one or more CSI Reports, are included in one CSI report setting. An example of the ASN. 1 code that corresponds to the CSI-ReportConfig reporting setting IE is provided in FIG. 7. Specifically, FIG. 7 is a schematic block diagram illustrating a first embodiment of ASN. 1 code 700 for triggering two CSI reports within CSI-ReportConfig reporting setting IE.

In a second embodiment for transmitting two or more CSI reports, a UE may be triggered to feed back two or more CSI reports within one reporting setting whenever the reporting setting includes one CodebookConfig codebook configuration, and a higher-layer parameter in CSI-ReportConfig is triggered that corresponds to multi-TRP transmission (e.g., parameter mTRPCSIEnabled).

In a third embodiment for transmitting two or more CSI reports, a UE may be triggered to feed back two or more CSI reports within one reporting setting whenever the reporting setting includes a higher-layer parameter in CSI-ReportConfig that refers to a number of CSI reports (e.g., parameter numCSIreports) which may be set to any of values {1,2,3, 4}. An example of the ASN.1 code the corresponds to the CSI-ReportConfig reporting setting IE is provided in FIG. 8. Specifically, FIG. 8 is a schematic block diagram illustrating a third embodiment of ASN.1 code 800 for triggering two CSI reports within CSI-ReportConfig reporting setting IE.

In a fourth embodiment for transmitting two or more CSI reports, a UE may be triggered to feed back two or more CSI reports within one reporting setting whenever the reporting setting includes one CodebookConfig codebook configuration, wherein the codebook configuration includes a higher-layer parameter that triggers the UE to report more than one CSI report (e.g., parameter numReports). An example of the ASN.1 code that corresponds to the CodebookConfig codebook configuration IE is provided in FIG. 9. Specifically, FIG. 9 is a schematic block diagram illustrating a fourth embodiment of ASN.1 code 900 for triggering two CSI reports within a CodebookConfig codebook configuration IE.

In a fifth embodiment for transmitting two or more CSI reports, a UE may be triggered to feed back one or more CSI reports within one reporting setting, wherein each CSI report includes more than one quantity for each of one or more of the following quantities: a CSI-RS resource indicator ("CRI"), a synchronization signal ("SS") and/or physical broadcast channel ("PBCH") ("SS/PBCH") block resource index ("SSBRI"), a RI, a PMI, a channel quality indicator ("CQI"), and/or a layer indicator ("LI") whenever the reporting setting includes one CodebookConfig codebook configuration with a higher-layer parameter that indicates numReportQuantities.

In a sixth embodiment for transmitting two or more CSI reports, a UE may be triggered to feed back one or more CSI reports within one reporting setting, wherein each CSI report includes more than one quantity for each of one or more of the following quantities: a CRI, an SSBRI, a RI, a PMI, a CQI, and/or a LI whenever one or more of the higher-layer parameters reportQuantity and reportQuantity-r16 in the reporting setting is set to a value that includes two quantities for one or more of the CRI, the SSBRI, the RI, the PMI, the CQI, and/or the LI (e.g., the parameter reportQuantity is set to 'CRI-2RI-2PMI-CQI').

In certain embodiments, a content of each CSI report may incur changes to adapt with the multi-channel hypothesis setup. In general, one CSI Report may contain at least a subset of one or more of the following quantities (e.g., CRI, SSBRI, RI, PMI, CQI, LI, L1 signal to interference and noise ratio ("SINR") ("L1-SINR"), L1 reference signal received power ("RSRP") ("L1-RSRP")), where one or more of each of the quantities may be included in the CSI report (e.g., two PMI). Additional quantities may be fed back in the CSI report as well. Different examples of the CSI report content under this setup are provided herein. Moreover, an embodiment with a combination of one or more of the following examples is not precluded.

In a first example, two quadruples (e.g., RI, PMI, LI, CQI) of indicators are reported in one CSI report. An additional indicator may be used corresponding to one or more of the aforementioned quadruples of indicators, wherein this indicator represents an additional rank indicator representing a number of layers within one layer-subset corresponding to a subset of the set of layers indicated in the number of layers reported in RI.

In a second example, two quadruples (e.g., RI, PMI, RI, CQI) of indicators are reported in one CSI report. An additional indicator may be used corresponding to one or more of the aforementioned quadruples of indicators, wherein this indicator parametrizes a size of one of two layer-subsets corresponding to the set of layers indicated by the indicator RI. The indicator may be represented by one bit, wherein the indicator value is set to '1' if a number of layers in a first layer-subset is larger than that of a number of layers in a second layer-subset, whereas the indicator value is set to '0' if the number of layers in the first layer-subset is smaller than that of the number of layers in the second layer-subset. The indicator value may be a dummy value whenever the number of layers in both layer subsets is the same, or whenever the RI is set to an even-numbered value.

In a third example, two quadruples (e.g., RI, PMI, RI, CQI) of indicators are reported in one CSI report. An additional indicator may be used corresponding to one or more of the aforementioned quadruples of indicators, wherein this indicator parametrizes a size of one of two layer-subsets corresponding to the set of layers indicated by the indicator RI. The additional indicator may be represented by one or more bits, wherein the indicator values correspond to different pairs of values corresponding to a number of layers in two layer-subsets of the layer sets corresponding to the CSI (e.g., the indicator value is represented by 4 bits representing 10 possible values of layer pairs ({1,1}, {1,2}, {2,1}, {2,2}, {2,3}, {3,2}, {3,3}, {3,4}, {4,3}, {4,4}) for the first and second layer subsets, respectively). In general, $\lceil \log_2 Q \rceil$ bits may be needed to represent Q different layer combinations.

In a fourth example, one or more quadruples (e.g., RI, PMI, RI, CQI) of indicators may be reported in one CSI report. An additional indicator may be used corresponding to one or more of the aforementioned quadruples of indicators, wherein this indicator identifies the channel, interference, and/or transmission hypotheses corresponding to each of the quadruples of indicators. For instance, in the presence of four different channel, interference, and/or transmission hypotheses, the indicator may be represented by 4 bits, wherein the number of bits representing the indicator may be the same as the number of hypotheses. The bit value corresponding to a reported hypothesis may be set to '1', whereas the bit value corresponding to a hypothesis that is not reported would be set to '0'. The indicator may be reported in CSI Part 1. Moreover, $\lceil \log_2 M \rceil$ bits may be used in the indicator to represent all the possible M hypotheses.

In various embodiments, each CSI report may include one or more CQI. Different embodiments of CQI feedback are provided herein. Embodiments with a combination of one or more of the embodiments herein is not precluded.

In a first embodiment of CQI reporting, a number of CQI reported in a CSI report is proportional to a number ("N") of PMI in a CSI report (e.g., NPMI=NCQI).

In a second embodiment of CQI reporting, whenever more than one CQI is reported in one CSI report, a first CQI is reported in a CSI Part 1, whereas all other subsequent CQI are reported in a CSI Part 2.

In a third embodiment of CQI reporting, whenever more than one CQI is reported, the CQI subsequent to a first CQI are computed in a differential manner with respect to a CSI Part 1 (e.g., CQI1=CQI1Reported and CQI2=CQI1Reported+CQI2Reported) where CQI1Reported, CQI2Reported represent the reported CQI index value in the CSI report, and CQI1, CQI2, represent the CQI index values adjusted by the network). The aforementioned CQI values may correspond to a wideband CQI index, a sub-band CQI index, or both.

In certain embodiments, each CSI report triggered within a reporting setting may be fed back in full, or partially. Different embodiments of CSI feedback reporting are found herein. Embodiments with a combination of one or more other embodiments may be made.

In some embodiments, a partial CSI report is transmitted if a UE is configured with one or more report configurations triggering multiple CSI reports, or one or more CSI reports each including one or more of PMI, RI, and/or CQI to be reported by the UE.

In various embodiments, a UE is configured with one reporting setting triggering two or more CSI reports. For one or more CSI reports, one of: {Part1, Part1+Part2 Group 0, Part1+Part2 Group0+Part2 Group 1} of the CSI report is fed back (e.g., one CSI report is fully fed back, whereas only Part 1 and Part 2, Group 1 of a second CSI report are fed back).

In certain embodiments, a UE is configured with one reporting setting triggering one CSI Report, where the report includes two PMI. Parameters of the first PMI are transmitted in full, while parameters of the second PMI are partially transmitted (e.g., one PMI is fully fed back, while the content of a second PMI are partially fed back).

In some embodiments, the terms antenna, panel, and antenna panel are used interchangeably. An antenna panel may be hardware that is used for transmitting and/or receiving radio signals at frequencies lower than 6 GHZ (e.g., frequency range 1 ("FR1")), or higher than 6 GHz (e.g., frequency range 2 ("FR2") or millimeter wave ("mm Wave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/pr unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}: 3) 'QCL-TypeC': {Doppler shift, average delay}; and 4) 'QCL-TypeD': {Spatial Rx parameter}. Other QCL-Types may be defined based on combination of one or large-scale properties.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In certain embodiments, QCL-TypeA, QCL-TypeB, and QCL-TypeC may be applicable for all carrier frequencies, but QCL-TypeD may be applicable only in higher carrier frequencies (e.g., mm Wave, FR2, and beyond), where the UE may not be able to perform omni-directional transmission (e.g., the UE would need to form beams for directional transmission). For a QCL-TypeD between two reference signals A and B, the reference signal A is considered to be spatially co-located with reference signal B and the UE may assume that the reference signals A and B can be received with the same spatial filter (e.g., with the same RX beamforming weights).

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In certain embodiments, a transmission configuration indicator ("TCI") state ("TCI-state") associated with a target transmission may indicate parameters for configuring a quasi-co-location relationship between the target transmission (e.g., target RS of demodulation ("DM") reference signal ("RS") ("DM-RS") ports of the target transmission during a transmission occasion) and a source reference signal (e.g., synchronization signal block ("SSB"), CSI-RS, and/or sounding reference signal ("SRS")) with respect to quasi co-location type parameters indicated in a corresponding TCI state. The TCI describes which reference signals are used as a QCL source, and what QCL properties may be derived from each reference signal. A device may receive a configuration of a plurality of transmission configuration indicator states for a serving cell for transmissions on the serving cell. In some embodiments, a TCI state includes at least one source RS to provide a reference (e.g., UE assumption) for determining QCL and/or a spatial filter.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

Figure 10:
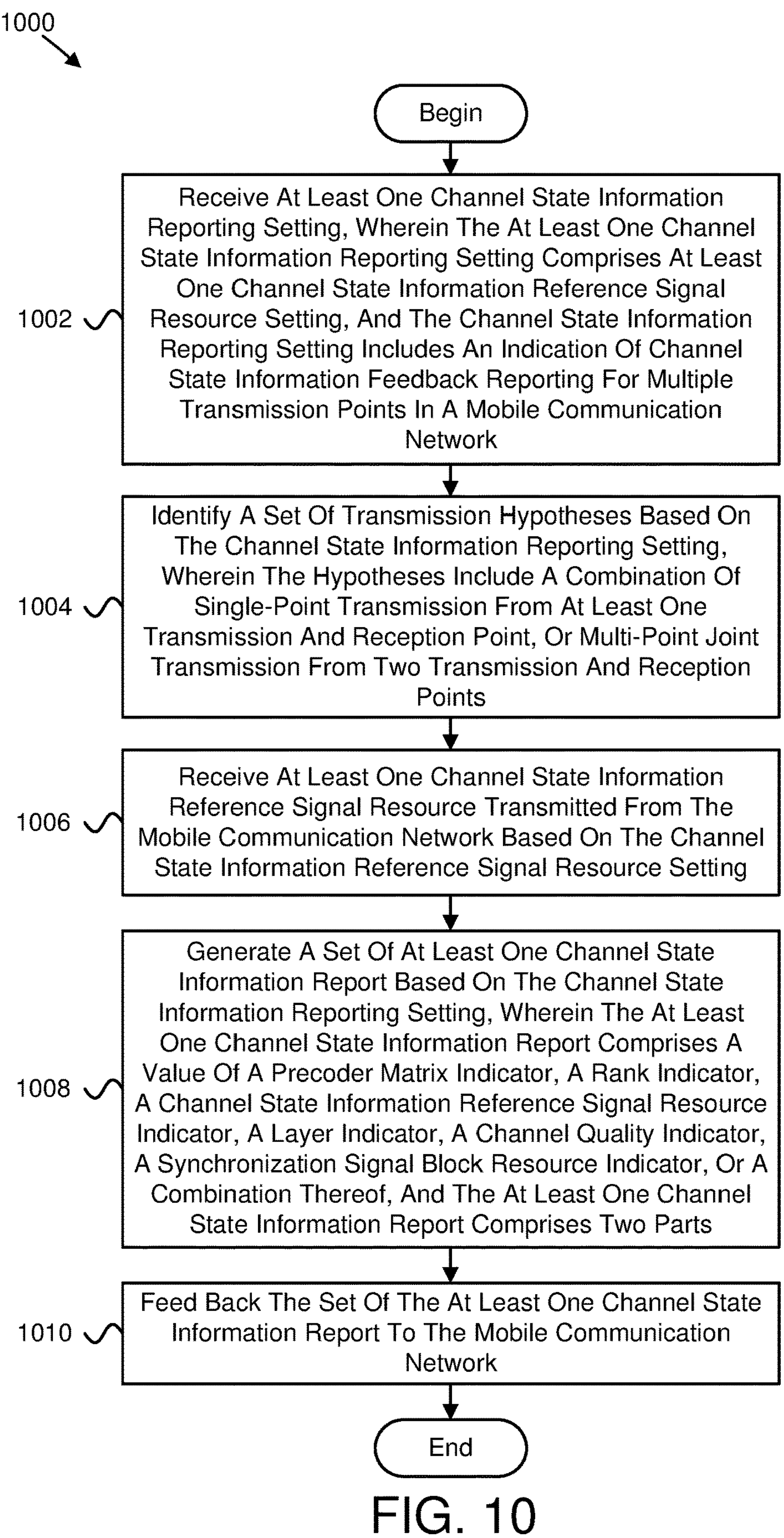
FIG. 10 is a flow chart diagram illustrating one embodiment of a method for channel state information report configuration.

FIG. 10 is a flow chart diagram illustrating one embodiment of a method 1000 for channel state information report configuration. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes receiving 1002 at least one channel state information reporting setting. The at least one channel state information reporting setting includes at least one channel state information reference signal resource setting, and the channel state information reporting setting includes an indication of channel state information feedback reporting for multiple transmission points in a mobile communication network. In some embodiments, the method 1000 includes identifying 1004 a set of transmission hypotheses based on the channel state information reporting setting. The hypotheses include a combination of single-point transmission from at least one transmission and reception point, or multi-point joint transmission from two transmission and reception points. In certain embodiments, the method 1000 includes receiving 1006 at least one channel state information reference signal resource transmitted from the mobile communication network based on the channel state information reference signal resource setting. In various embodiments, the method 1000 includes generating 1008 a set of at least one channel state information report based on the channel state information reporting setting. The at least one channel state information report includes a value of a precoder matrix indicator, a rank indicator, a channel state information reference signal resource indicator, a layer indicator, a channel quality indicator, a synchronization signal block resource indicator, or a combination thereof, and the at least one channel state information report includes two parts. In some embodiments, the method 1000 includes feeding 1010 back the set of the at least one channel state information report to the mobile communication network.

In certain embodiments, the indication of channel state information feedback reporting for multiple transmission points in the mobile communication network comprises a configuration parameter, and the configuration parameter: indicates multiple transmission and reception point channel state information reporting: includes at least two channel state information reference signal identifiers corresponding to at least two channel state information reference signal resources: indicates two channel state information reference signal port groups per channel state information reference signal resource: indicates a number of channel state information reports; indicates multiple codebook configurations: indicates a pair of report quantities: indicates a transmission configuration indicator codepoint in a downlink control information, wherein the transmission configuration indicator codepoint corresponds to two transmission configuration indicator states: or some combination thereof. In some embodiments, up to multiple values of the precoder matrix indicator, the rank indicator, the channel state information reference signal resource indicator, the layer indicator, the channel quality indicator, the synchronization signal block resource indicator, or the combination thereof are reported in the at least one channel state information report.

In various embodiments, at least two values of each of the rank indicator, the precoder matrix indicator, the layer index, and the channel quality indicator are reported in the at least one channel state information report. In one embodiment, an indicator corresponding to a third rank indicator value is reported in the at least one channel state information report. In certain embodiments, an indicator corresponding to at least one transmission hypotheses of the set of transmission hypotheses is reported in a first part of the two parts of the at least one channel state information report.

In some embodiments, the indicator comprises: a bitmap with a length equivalent to a size of the set of transmission hypotheses: or an indicator of a size corresponding to a base-2 logarithm of the size of the set of transmission hypotheses. In various embodiments, multiple values of the channel quality indicator are reported in the at least one channel state information report, and a first value of the multiple values of the channel quality indicator is reported in a first part of the two parts of the at least one channel state information report, and a remainder of the multiple values of the channel quality indicator are reported in a second part of the two parts of the at least one channel state information report. In one embodiment, the precoder matrix indicator of the at least one channel state information report comprises two parts.

In certain embodiments, at least two values of the precoder matrix indicator are reported in the at least one channel state information report, a first value of the at least two values of the precoder matrix indicator is reported in the at least one channel state information report, and a first part of the two parts of a second value of the at least two values of the precoder matrix indicator is reported in the at least one channel state information report. In some embodiments, the at least one channel state information report comprises two channel state information reports, feeding back the set of the at least one channel state information report comprises feeding back the two channel state information reports, a first channel state information report of the two channel state information reports is reported in full, and a second channel state information report of the two channel state information reports is partially reported. In various embodiments, the multi-point joint transmission from two transmission and reception points corresponds to a transmission configuration indicator codepoint comprising two transmission configuration indicator states.

Figure 11:
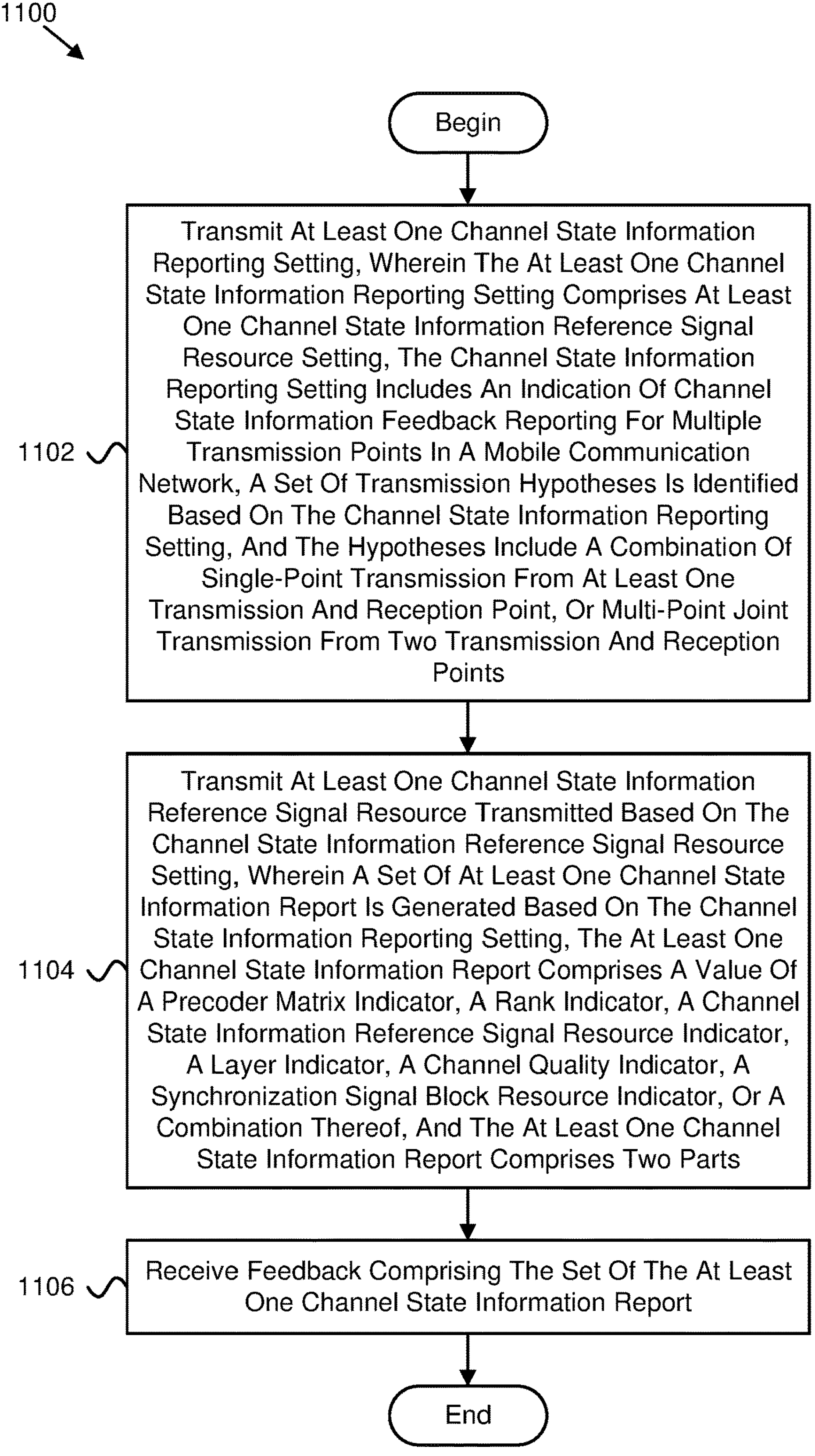
FIG. 11 is a flow chart diagram illustrating another embodiment of a method for channel state information report configuration.

FIG. 11 is a flow chart diagram illustrating another embodiment of a method 1100 for channel state information report configuration. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes transmitting 1102 at least one channel state information reporting setting. The at least one channel state information reporting setting includes at least one channel state information reference signal resource setting, the channel state information reporting setting includes an indication of channel state information feedback reporting for multiple transmission points in a mobile communication network, a set of transmission hypotheses is identified based on the channel state information reporting setting, and the hypotheses include a combination of single-point transmission from at least one transmission and reception point, or multi-point joint transmission from two transmission and reception points. In some embodiments, the method 1100 includes transmitting 1104 at least one channel state information reference signal resource transmitted based on the channel state information reference signal resource setting. A set of at least one channel state information report is generated based on the channel state information reporting setting, the at least one channel state information report includes a value of a precoder matrix indicator, a rank indicator, a channel state information reference signal resource indicator, a layer indicator, a channel quality indicator, a synchronization signal block resource indicator, or a combination thereof, and the at least one channel state information report includes two parts. In certain embodiments, the method 1100 includes receiving 1106 feedback comprising the set of the at least one channel state information report.

In certain embodiments, the indication of channel state information feedback reporting for multiple transmission points in the mobile communication network comprises a configuration parameter, and the configuration parameter: indicates multiple transmission and reception point channel state information reporting: includes at least two channel state information reference signal identifiers corresponding to at least two channel state information reference signal resources: indicates two channel state information reference signal port groups per channel state information reference signal resource: indicates a number of channel state information reports; indicates multiple codebook configurations: indicates a pair of report quantities: indicates a transmission configuration indicator codepoint in a downlink control information, wherein the transmission configuration indicator codepoint corresponds to two transmission configuration indicator states: or some combination thereof. In some embodiments, up to multiple values of the precoder matrix indicator, the rank indicator, the channel state information reference signal resource indicator, the layer indicator, the channel quality indicator, the synchronization signal block resource indicator, or the combination thereof are reported in the at least one channel state information report.

In various embodiments, at least two values of each of the rank indicator, the precoder matrix indicator, the layer index, and the channel quality indicator are reported in the at least one channel state information report. In one embodiment, an indicator corresponding to a third rank indicator value is reported in the at least one channel state information report. In certain embodiments, an indicator corresponding to at least one transmission hypotheses of the set of transmission hypotheses is reported in a first part of the two parts of the at least one channel state information report.

In some embodiments, the indicator comprises: a bitmap with a length equivalent to a size of the set of transmission hypotheses: or an indicator of a size corresponding to a base-2 logarithm of the size of the set of transmission hypotheses. In various embodiments, multiple values of the channel quality indicator are reported in the at least one channel state information report, and a first value of the multiple values of the channel quality indicator is reported in a first part of the two parts of the at least one channel state information report, and a remainder of the multiple values of the channel quality indicator are reported in a second part of the two parts of the at least one channel state information report. In one embodiment, the precoder matrix indicator of the at least one channel state information report comprises two parts.

In certain embodiments, at least two values of the precoder matrix indicator are reported in the at least one channel state information report, a first value of the at least two values of the precoder matrix indicator is reported in the at least one channel state information report, and a first part of the two parts of a second value of the at least two values of the precoder matrix indicator is reported in the at least one channel state information report. In some embodiments, the at least one channel state information report comprises two channel state information reports, feeding back the set of the at least one channel state information report comprises feeding back the two channel state information reports, a first channel state information report of the two channel state information reports is reported in full, and a second channel state information report of the two channel state information reports is partially reported. In various embodiments, the multi-point joint transmission from two transmission and reception points corresponds to a transmission configuration indicator codepoint comprising two transmission configuration indicator states.

In one embodiment, a method of a user equipment comprises: receiving at least one channel state information reporting setting, wherein the at least one channel state information reporting setting comprises at least one channel state information reference signal resource setting, and the channel state information reporting setting includes an indication of channel state information feedback reporting for multiple transmission points in a mobile communication network: identifying a set of transmission hypotheses based on the channel state information reporting setting, wherein the hypotheses include a combination of single-point transmission from at least one transmission and reception point, or multi-point joint transmission from two transmission and reception points: receiving at least one channel state information reference signal resource transmitted from the mobile communication network based on the channel state information reference signal resource setting: generating a set of at least one channel state information report based on the channel state information reporting setting, wherein the at least one channel state information report comprises a value of a precoder matrix indicator, a rank indicator, a channel state information reference signal resource indicator, a layer indicator, a channel quality indicator, a synchronization signal block resource indicator, or a combination thereof, and the at least one channel state information report comprises two parts; and feeding back the set of the at least one channel state information report to the mobile communication network.

In certain embodiments, the indication of channel state information feedback reporting for multiple transmission points in the mobile communication network comprises a configuration parameter, and the configuration parameter: indicates multiple transmission and reception point channel state information reporting: includes at least two channel state information reference signal identifiers corresponding to at least two channel state information reference signal resources: indicates two channel state information reference signal port groups per channel state information reference signal resource: indicates a number of channel state information reports; indicates multiple codebook configurations: indicates a pair of report quantities: indicates a transmission configuration indicator codepoint in a downlink control information, wherein the transmission configuration indicator codepoint corresponds to two transmission configuration indicator states: or some combination thereof.

In some embodiments, up to multiple values of the precoder matrix indicator, the rank indicator, the channel state information reference signal resource indicator, the layer indicator, the channel quality indicator, the synchronization signal block resource indicator, or the combination thereof are reported in the at least one channel state information report.

In various embodiments, at least two values of each of the rank indicator, the precoder matrix indicator, the layer index, and the channel quality indicator are reported in the at least one channel state information report.

In one embodiment, an indicator corresponding to a third rank indicator value is reported in the at least one channel state information report.

In certain embodiments, an indicator corresponding to at least one transmission hypotheses of the set of transmission hypotheses is reported in a first part of the two parts of the at least one channel state information report.

In some embodiments, the indicator comprises: a bitmap with a length equivalent to a size of the set of transmission hypotheses: or an indicator of a size corresponding to a base-2 logarithm of the size of the set of transmission hypotheses.

In various embodiments, multiple values of the channel quality indicator are reported in the at least one channel state information report, and a first value of the multiple values of the channel quality indicator is reported in a first part of the two parts of the at least one channel state information report, and a remainder of the multiple values of the channel quality indicator are reported in a second part of the two parts of the at least one channel state information report.

In one embodiment, the precoder matrix indicator of the at least one channel state information report comprises two parts.

In certain embodiments, at least two values of the precoder matrix indicator are reported in the at least one channel state information report, a first value of the at least two values of the precoder matrix indicator is reported in the at least one channel state information report, and a first part of the two parts of a second value of the at least two values of the precoder matrix indicator is reported in the at least one channel state information report.

In some embodiments, the at least one channel state information report comprises two channel state information reports, feeding back the set of the at least one channel state information report comprises feeding back the two channel state information reports, a first channel state information report of the two channel state information reports is reported in full, and a second channel state information report of the two channel state information reports is partially reported.

In various embodiments, the multi-point joint transmission from two transmission and reception points corresponds to a transmission configuration indicator codepoint comprising two transmission configuration indicator states.

In one embodiment, an apparatus comprises a user equipment. The apparatus further comprises: a receiver that receives at least one channel state information reporting setting, wherein the at least one channel state information reporting setting comprises at least one channel state information reference signal resource setting, and the channel state information reporting setting includes an indication of channel state information feedback reporting for multiple transmission points in a mobile communication network: a processor that identifies a set of transmission hypotheses based on the channel state information reporting setting, wherein the hypotheses include a combination of single-point transmission from at least one transmission and reception point, or multi-point joint transmission from two transmission and reception points; and a transmitter, wherein: the receiver receives at least one channel state information reference signal resource transmitted from the mobile communication network based on the channel state information reference signal resource setting: the processor generates a set of at least one channel state information report based on the channel state information reporting setting, wherein the at least one channel state information report comprises a value of a precoder matrix indicator, a rank indicator, a channel state information reference signal resource indicator, a layer indicator, a channel quality indicator, a synchronization signal block resource indicator, or a combination thereof, and the at least one channel state information report comprises two parts; and the transmitter feeds back the set of the at least one channel state information report to the mobile communication network.

In certain embodiments, the indication of channel state information feedback reporting for multiple transmission points in the mobile communication network comprises a configuration parameter, and the configuration parameter: indicates multiple transmission and reception point channel state information reporting: includes at least two channel state information reference signal identifiers corresponding to at least two channel state information reference signal resources: indicates two channel state information reference signal port groups per channel state information reference signal resource: indicates a number of channel state information reports; indicates multiple codebook configurations: indicates a pair of report quantities: indicates a transmission configuration indicator codepoint in a downlink control information, wherein the transmission configuration indicator codepoint corresponds to two transmission configuration indicator states: or some combination thereof.

In some embodiments, up to multiple values of the precoder matrix indicator, the rank indicator, the channel state information reference signal resource indicator, the layer indicator, the channel quality indicator, the synchronization signal block resource indicator, or the combination thereof are reported in the at least one channel state information report.

In various embodiments, at least two values of each of the rank indicator, the precoder matrix indicator, the layer index, and the channel quality indicator are reported in the at least one channel state information report.

In one embodiment, an indicator corresponding to a third rank indicator value is reported in the at least one channel state information report.

In certain embodiments, an indicator corresponding to at least one transmission hypotheses of the set of transmission hypotheses is reported in a first part of the two parts of the at least one channel state information report.

In some embodiments, the indicator comprises: a bitmap with a length equivalent to a size of the set of transmission hypotheses: or an indicator of a size corresponding to a base-2 logarithm of the size of the set of transmission hypotheses.

In various embodiments, multiple values of the channel quality indicator are reported in the at least one channel state information report, and a first value of the multiple values of the channel quality indicator is reported in a first part of the two parts of the at least one channel state information report, and a remainder of the multiple values of the channel quality indicator are reported in a second part of the two parts of the at least one channel state information report.

In one embodiment, the precoder matrix indicator of the at least one channel state information report comprises two parts.

In certain embodiments, at least two values of the precoder matrix indicator are reported in the at least one channel state information report, a first value of the at least two values of the precoder matrix indicator is reported in the at least one channel state information report, and a first part of the two parts of a second value of the at least two values of the precoder matrix indicator is reported in the at least one channel state information report.

In some embodiments, the at least one channel state information report comprises two channel state information reports, feeding back the set of the at least one channel state information report comprises feeding back the two channel state information reports, a first channel state information report of the two channel state information reports is reported in full, and a second channel state information report of the two channel state information reports is partially reported.

In various embodiments, the multi-point joint transmission from two transmission and reception points corresponds to a transmission configuration indicator codepoint comprising two transmission configuration indicator states.

In one embodiment, a method of a network device comprises: transmitting at least one channel state information reporting setting, wherein the at least one channel state information reporting setting comprises at least one channel state information reference signal resource setting, the channel state information reporting setting includes an indication of channel state information feedback reporting for multiple transmission points in a mobile communication network, a set of transmission hypotheses is identified based on the channel state information reporting setting, and the hypotheses include a combination of single-point transmission from at least one transmission and reception point, or multi-point joint transmission from two transmission and reception points; transmitting at least one channel state information reference signal resource transmitted based on the channel state information reference signal resource setting, wherein a set of at least one channel state information report is generated based on the channel state information reporting setting, the at least one channel state information report comprises a value of a precoder matrix indicator, a rank indicator, a channel state information reference signal resource indicator, a layer indicator, a channel quality indicator, a synchronization signal block resource indicator, or a combination thereof, and the at least one channel state information report comprises two parts; and receiving feedback comprising the set of the at least one channel state information report.

In certain embodiments, the indication of channel state information feedback reporting for multiple transmission points in the mobile communication network comprises a configuration parameter, and the configuration parameter: indicates multiple transmission and reception point channel state information reporting: includes at least two channel state information reference signal identifiers corresponding to at least two channel state information reference signal resources: indicates two channel state information reference signal port groups per channel state information reference signal resource: indicates a number of channel state information reports; indicates multiple codebook configurations: indicates a pair of report quantities: indicates a transmission configuration indicator codepoint in a downlink control information, wherein the transmission configuration indicator codepoint corresponds to two transmission configuration indicator states: or some combination thereof.

In some embodiments, up to multiple values of the precoder matrix indicator, the rank indicator, the channel state information reference signal resource indicator, the layer indicator, the channel quality indicator, the synchronization signal block resource indicator, or the combination thereof are reported in the at least one channel state information report.

In various embodiments, at least two values of each of the rank indicator, the precoder matrix indicator, the layer index, and the channel quality indicator are reported in the at least one channel state information report.

In one embodiment, an indicator corresponding to a third rank indicator value is reported in the at least one channel state information report.

In certain embodiments, an indicator corresponding to at least one transmission hypotheses of the set of transmission hypotheses is reported in a first part of the two parts of the at least one channel state information report.

In some embodiments, the indicator comprises: a bitmap with a length equivalent to a size of the set of transmission hypotheses: or an indicator of a size corresponding to a base-2 logarithm of the size of the set of transmission hypotheses.

In various embodiments, multiple values of the channel quality indicator are reported in the at least one channel state information report, and a first value of the multiple values of the channel quality indicator is reported in a first part of the two parts of the at least one channel state information report, and a remainder of the multiple values of the channel quality indicator are reported in a second part of the two parts of the at least one channel state information report.

In one embodiment, the precoder matrix indicator of the at least one channel state information report comprises two parts.

In certain embodiments, at least two values of the precoder matrix indicator are reported in the at least one channel state information report, a first value of the at least two values of the precoder matrix indicator is reported in the at least one channel state information report, and a first part of the two parts of a second value of the at least two values of the precoder matrix indicator is reported in the at least one channel state information report.

In some embodiments, the at least one channel state information report comprises two channel state information reports, feeding back the set of the at least one channel state information report comprises feeding back the two channel state information reports, a first channel state information report of the two channel state information reports is reported in full, and a second channel state information report of the two channel state information reports is partially reported.

In various embodiments, the multi-point joint transmission from two transmission and reception points corresponds to a transmission configuration indicator codepoint comprising two transmission configuration indicator states.

In one embodiment, an apparatus comprises a network device. The apparatus further comprises: a transmitter that: transmits at least one channel state information reporting setting, wherein the at least one channel state information reporting setting comprises at least one channel state information reference signal resource setting, the channel state information reporting setting includes an indication of channel state information feedback reporting for multiple transmission points in a mobile communication network, a set of transmission hypotheses is identified based on the channel state information reporting setting, and the hypotheses include a combination of single-point transmission from at least one transmission and reception point, or multi-point joint transmission from two transmission and reception points; and transmits at least one channel state information reference signal resource transmitted based on the channel state information reference signal resource setting, wherein a set of at least one channel state information report is generated based on the channel state information reporting setting, the at least one channel state information report comprises a value of a precoder matrix indicator, a rank indicator, a channel state information reference signal resource indicator, a layer indicator, a channel quality indicator, a synchronization signal block resource indicator, or a combination thereof, and the at least one channel state information report comprises two parts; and a receiver that receives feedback comprising the set of the at least one channel state information report.

In certain embodiments, the indication of channel state information feedback reporting for multiple transmission points in the mobile communication network comprises a configuration parameter, and the configuration parameter: indicates multiple transmission and reception point channel state information reporting: includes at least two channel state information reference signal identifiers corresponding to at least two channel state information reference signal resources: indicates two channel state information reference signal port groups per channel state information reference signal resource: indicates a number of channel state information reports; indicates multiple codebook configurations: indicates a pair of report quantities: indicates a transmission configuration indicator codepoint in a downlink control information, wherein the transmission configuration indicator codepoint corresponds to two transmission configuration indicator states: or some combination thereof.

In some embodiments, up to multiple values of the precoder matrix indicator, the rank indicator, the channel state information reference signal resource indicator, the layer indicator, the channel quality indicator, the synchronization signal block resource indicator, or the combination thereof are reported in the at least one channel state information report.

In various embodiments, at least two values of each of the rank indicator, the precoder matrix indicator, the layer index, and the channel quality indicator are reported in the at least one channel state information report.

In one embodiment, an indicator corresponding to a third rank indicator value is reported in the at least one channel state information report.

In certain embodiments, an indicator corresponding to at least one transmission hypotheses of the set of transmission hypotheses is reported in a first part of the two parts of the at least one channel state information report.

In some embodiments, the indicator comprises: a bitmap with a length equivalent to a size of the set of transmission hypotheses: or an indicator of a size corresponding to a base-2 logarithm of the size of the set of transmission hypotheses.

In various embodiments, multiple values of the channel quality indicator are reported in the at least one channel state information report, and a first value of the multiple values of the channel quality indicator is reported in a first part of the two parts of the at least one channel state information report, and a remainder of the multiple values of the channel quality indicator are reported in a second part of the two parts of the at least one channel state information report.

In one embodiment, the precoder matrix indicator of the at least one channel state information report comprises two parts.

In certain embodiments, at least two values of the precoder matrix indicator are reported in the at least one channel state information report, a first value of the at least two values of the precoder matrix indicator is reported in the at least one channel state information report, and a first part of the two parts of a second value of the at least two values of the precoder matrix indicator is reported in the at least one channel state information report.

In some embodiments, the at least one channel state information report comprises two channel state information reports, feeding back the set of the at least one channel state information report comprises feeding back the two channel state information reports, a first channel state information report of the two channel state information reports is reported in full, and a second channel state information report of the two channel state information reports is partially reported.

In various embodiments, the multi-point joint transmission from two transmission and reception points corresponds to a transmission configuration indicator codepoint comprising two transmission configuration indicator states.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a user equipment (UE), the method comprising:

receiving at least one channel state information (CSI) reporting setting, wherein the at least one CSI reporting setting comprises at least one CSI reference signal (RS) (CSI-RS) resource setting, and the CSI reporting setting includes an indication of CSI feedback reporting for multiple transmission points in a mobile communication network;

identifying a set of transmission hypotheses based on the CSI reporting setting, wherein the hypotheses include a combination of single-point transmission from at least one transmission and reception point (TRP), or multi-point joint transmission from two TRPs;

receiving at least one CSI-RS resource transmitted from the mobile communication network based on the CSI-RS resource setting;

generating a set of at least one CSI report based on the CSI reporting setting, wherein the at least one CSI report comprises a value of one or more of a precoder matrix indicator (PMI), a rank indicator (RI), a CSI-RS resource indicator (CRI), a layer indicator (LI), a channel quality indicator (CQI), or a synchronization signal block resource indicator (SSBRI), and the at least one CSI report comprises two parts, wherein a number of bits in the at least one CSI report corresponding to the set of transmission hypotheses is calculated based on a number of hypotheses in the set of transmission hypotheses, and wherein the at least one CSI report further comprises an indicator corresponding to at least one transmission hypothesis of the set of transmission hypotheses, the indicator comprising a bitmap having a length equal to a size of the set of transmission hypotheses and included in a first part of the two parts of the at least one CSI report; and feeding back the set of the at least one CSI report to the mobile communication network.

2. The method of claim 1, wherein the indication of CSI feedback reporting for multiple transmission points in the mobile communication network comprises a configuration parameter, and the configuration parameter indicates one or more of:

multiple TRP CSI reporting;

at least two CSI-RS identifiers corresponding to at least two CSI-RS resources;

two CSI-RS port groups per CSI-RS resource;

a number of CSI reports;

multiple codebook configurations;

a pair of report quantities; or a transmission configuration indicator (TCI) codepoint in a downlink control information, wherein the TCI codepoint corresponds to two TCI states.

3. The method of claim 1, wherein up to multiple values of the one or more of the PMI, the RI, the CRI, the LI, the CQI, or the SSBRI are reported in the at least one CSI report.

4. The method of claim 1, wherein at least two values of each of the RI, the PMI, the LI, and the CQI are reported in the at least one CSI report.

5. The method of claim 4, wherein an indicator corresponding to a third RI value is reported in the at least one CSI report.

6. The method of claim 1, wherein an indicator corresponding to at least one transmission hypotheses of the set of transmission hypotheses is reported in a first part of the two parts of the at least one CSI report.

7. The method of claim 6, wherein the indicator comprises:

a bitmap with a length equivalent to a size of the set of transmission hypotheses; or an indicator of a size corresponding to a base-2 logarithm of the size of the set of transmission hypotheses.

8. The method of claim 1, wherein multiple values of the CQI are reported in the at least one CSI report, and a first value of the multiple values of the CQI is reported in a first part of the two parts of the at least one CSI report, and a remainder of the multiple values of the CQI are reported in a second part of the two parts of the at least one CSI report.

9. The method of claim 1, wherein the PMI of the at least one CSI report comprises two parts.

10. The method of claim 9, wherein at least two values of the PMI are reported in the at least one CSI report, a first value of the at least two values of the PMI is reported in the at least one CSI report, and a first part of the two parts of a second value of the at least two values of the PMI is reported in the at least one CSI report.

11. The method of claim 1, wherein the at least one CSI report comprises two CSI reports, feeding back the set of the at least one CSI report comprises feeding back the two CSI reports, a first CSI report of the two CSI reports is reported in full, and a second CSI report of the two CSI reports is partially reported.

12. The method of claim 1, wherein the multi-point joint transmission from two TRPs corresponds to a transmission configuration indicator (TCI) codepoint comprising two TCI states.

13. A method performed by a base station, the method comprising:

transmitting at least one channel state information (CSI) reporting setting, wherein the at least one CSI reporting setting comprises at least one CSI reference signal (RS) (CSI-RS) resource setting, the CSI reporting setting includes an indication of CSI feedback reporting for multiple transmission points in a mobile communication network, a set of transmission hypotheses is identified based on the CSI reporting setting, and the hypotheses include a combination of single-point transmission from at least one transmission and reception point (TRP), or multi-point joint transmission from two TRPs;

transmitting at least one CSI-RS resource transmitted based on the CSI-RS resource setting, wherein a set of at least one CSI report is generated based on the CSI reporting setting, the at least one CSI report comprises a value of one or more of a precoder matrix indicator (PMI), a rank indicator (RI), a CSI-RS resource indicator (CRI), a layer indicator (LI), a channel quality indicator (CQI), or a synchronization signal block resource indicator (SSBRI), and the at least one CSI report comprises two parts; and receiving feedback comprising the set of the at least one CSI report, wherein a number of bits in the at least one CSI report corresponding to the set of transmission hypotheses is calculated based on a number of hypotheses in the set of transmission hypotheses, and wherein the at least one CSI report further comprises an indicator corresponding to at least one transmission hypothesis of the set of transmission hypotheses, the indicator comprising a bitmap having a length equal to a size of the set of transmission hypotheses and included in a first part of the two parts of the at least one CSI report.

14. The method of claim 13, wherein at least two values of each of the RI, the PMI, the LI, and the CQI are reported in the at least one CSI report.

15. A base station, comprising:

at least one memory; and at least one processor coupled with the at least one memory and configured to cause the base station to:

transmit at least one channel state information (CSI) reporting setting, wherein the at least one CSI reporting setting comprises at least one CSI reference signal (RS) (CSI-RS) resource setting, the CSI reporting setting includes an indication of CSI feedback reporting for multiple transmission points in a mobile communication network, a set of transmission hypotheses is identified based on the CSI reporting setting, and the hypotheses include a combination of single-point transmission from at least one transmission and reception point (TRP), or multi-point joint transmission from two TRPs;

transmit at least one CSI-RS resource transmitted based on the CSI-RS resource setting, wherein a set of at least one CSI report is generated based on the CSI reporting setting, the at least one CSI report comprises a value of one or more of a precoder matrix indicator (PMI), a rank indicator (RI), a CSI-RS resource indicator (CRI), a layer indicator (LI), a channel quality indicator (CQI), or a synchronization signal block resource indicator (SSBRI), and the at least one CSI report comprises two parts; and receive feedback comprising the set of the at least one CSI report, wherein a number of bits in the at least one CSI report corresponding to the set of transmission hypotheses is calculated based on a number of hypotheses in the set of transmission hypotheses, and wherein the at least one CSI report further comprises an indicator corresponding to at least one transmission hypothesis of the set of transmission hypotheses, the indicator comprising a bitmap having a length equal to a size of the set of transmission hypotheses and included in a first part of the two parts of the at least one CSI report.

16. The base station of claim 15, wherein the indication of CSI feedback reporting for multiple transmission points in the mobile communication network comprises a configuration parameter, and the configuration parameter indicates one or more of:

multiple TRP CSI reporting;

at least two CSI-RS identifiers corresponding to at least two CSI-RS resources;

two CSI-RS port groups per CSI-RS resource;

a number of CSI reports;

multiple codebook configurations;

a pair of report quantities; or a transmission configuration indicator (TCI) codepoint in a downlink control information, wherein the TCI codepoint corresponds to two TCI states.

17. The base station of claim 15, wherein up to multiple values of the one or more of the PMI, the RI, the CRI, the LI, the CQI, or the SSBRI are reported in the at least one CSI report.

18. The base station of claim 15, wherein at least two values of each of the RI, the PMI, the LI, and the CQI are reported in the at least one CSI report.

19. The base station of claim 18, wherein an indicator corresponding to a third RI value is reported in the at least one CSI report.

20. The base station of claim 15, wherein an indicator corresponding to at least one transmission hypotheses of the set of transmission hypotheses is reported in a first part of the two parts of the at least one CSI report.

* * * * *